US010068319B2

United States Patent
Bertens

(10) Patent No.: US 10,068,319 B2
(45) Date of Patent: Sep. 4, 2018

(54) METHOD FOR NOISE REDUCTION IN AN IMAGE SEQUENCE

(71) Applicant: Agfa HealthCare, Mortsel (BE)

(72) Inventor: Tom Bertens, Mortsel (BE)

(73) Assignee: AGFA HEALTHCARE NV, Mortsel (BE)

(*) Notice: Subject to any disclaimer, the term of this patent is extended or adjusted under 35 U.S.C. 154(b) by 0 days.

(21) Appl. No.: 15/021,961

(22) PCT Filed: Sep. 15, 2014

(86) PCT No.: PCT/EP2014/069600
§ 371 (c)(1),
(2) Date: Mar. 15, 2016

(87) PCT Pub. No.: WO2015/049103
PCT Pub. Date: Apr. 9, 2015

(65) Prior Publication Data
US 2016/0232648 A1 Aug. 11, 2016

(30) Foreign Application Priority Data

Oct. 1, 2013 (EP) .................................... 13186855

(51) Int. Cl.
*G06K 9/00* (2006.01)
*G06T 5/00* (2006.01)
*G06T 5/50* (2006.01)

(52) U.S. Cl.
CPC ............... *G06T 5/002* (2013.01); *G06T 5/50* (2013.01); *G06T 2207/10016* (2013.01);
(Continued)

(58) Field of Classification Search
CPC ....... A61B 5/7425; A61B 6/463; A61B 6/481; A61B 6/484; A61B 6/485; A61B 6/486;
(Continued)

(56) References Cited

U.S. PATENT DOCUMENTS 4,504,908 A * 3/1985 Riederer ................ A61B 6/481
128/922
6,766,064 B1 * 7/2004 Langan .................. G06T 5/008
382/131
(Continued)

FOREIGN PATENT DOCUMENTS

WO 2005/071595 A1 8/2005

OTHER PUBLICATIONS

Official Communication issued in International Patent Application No. PCT/EP2014/069600, dated Dec. 2, 2014.
(Continued)

*Primary Examiner* — Jose Couso
(74) *Attorney, Agent, or Firm* — Keating and Bennett, LLP

(57) ABSTRACT

A method for processing a frame in a sequence of successively acquired frames in dynamic digital radiography includes the multi-scale representation of frames being subjected to temporal filtering by adding at least one correction image to a corresponding detail image(s) in the multi-scale representations of a frame of interest, the correction image being computed by combining clipped difference images obtained as the difference between the multi-scale representation of the frame of interest and the multi-scale representations of a selection of other frames in said sequence.

10 Claims, 1 Drawing Sheet

(52) U.S. Cl.
CPC ............. *G06T 2207/10121* (2013.01); *G06T 2207/20016* (2013.01); *G06T 2207/20182* (2013.01); *G06T 2207/20224* (2013.01)

(58) Field of Classification Search
CPC ........... A61B 6/502; A61B 6/504; A61B 6/52; A61B 6/5258; A61B 8/463; A61B 2576/00; G06T 5/00; G06T 5/001–5/003; G06T 5/005; G06T 5/50; G06T 7/0012; G06T 7/97; G06T 2207/00; G06T 2207/10016; G06T 2207/10081; G06T 2207/10116; G06T 2207/10121; G06T 2207/20016; G06T 2207/20032; G06T 2207/20172; G06T 2207/20182; G06T 2207/20192; G06T 2207/20224; G06T 2207/30104; G01R 31/1218; G01R 33/281; G01R 33/561; G01R 33/5619; G01R 33/56308; G01R 33/334812; G06K 7/10; G06K 7/10009; G06K 7/1099; G06K 7/10544; G06K 9/40; G06K 9/56; G06K 15/1223; G06K 15/1872; H04N 1/409; H04N 1/4092; H04N 1/58; H04N 5/21; H04N 5/3205; H04N 5/325; H04N 9/646; H04N 19/34; H04N 21/23418; H04N 21/234327; H04N 21/440227; H04N 21/4545; Y10S 128/922; Y10S 378/00; Y10S 378/901; Y10S 430/00; Y10S 430/167; Y10S 430/168; Y10S 977/901; Y10S 977/927; Y10S 977/928; G01N 23/046; G01N 2223/419; G01N 2223/612; H05G 1/60; H05G 1/64
See application file for complete search history.

(56) References Cited

U.S. PATENT DOCUMENTS

| | | | | |
|---|---|---|---|---|
| 7,050,501 | B2 * | 5/2006 | Alvarez | H04N 5/21 348/701 |
| 7,551,232 | B2 * | 6/2009 | Winger | H04N 5/21 348/607 |
| 7,639,741 | B1 * | 12/2009 | Holt | G06T 5/50 375/240.08 |
| 9,105,081 | B2 * | 8/2015 | Wong | G06T 5/20 |
| 9,224,202 | B2 * | 12/2015 | De Haan | G06T 7/0016 |
| 2017/0161893 | A1 * | 6/2017 | Carnes | G06T 7/0012 |

OTHER PUBLICATIONS

Aach et al., "Spatiotemporal Multiscale Vessel Enhancement for Coronary Angiograms", Progress in Biomedical Optics and Imaging, SPIE—International Society for Optical Engineering, Jan. 28, 2002, 13 pages, vol. 4684, Bellingham, WA.

Hensel et al., "Real-Time Denoising of Medical X-Ray Image Sequences: Three Entirely Different Approaches", Lecture Notes in Computer Science, Jan. 1, 2006, 12 pages, Springer, DE.

* cited by examiner

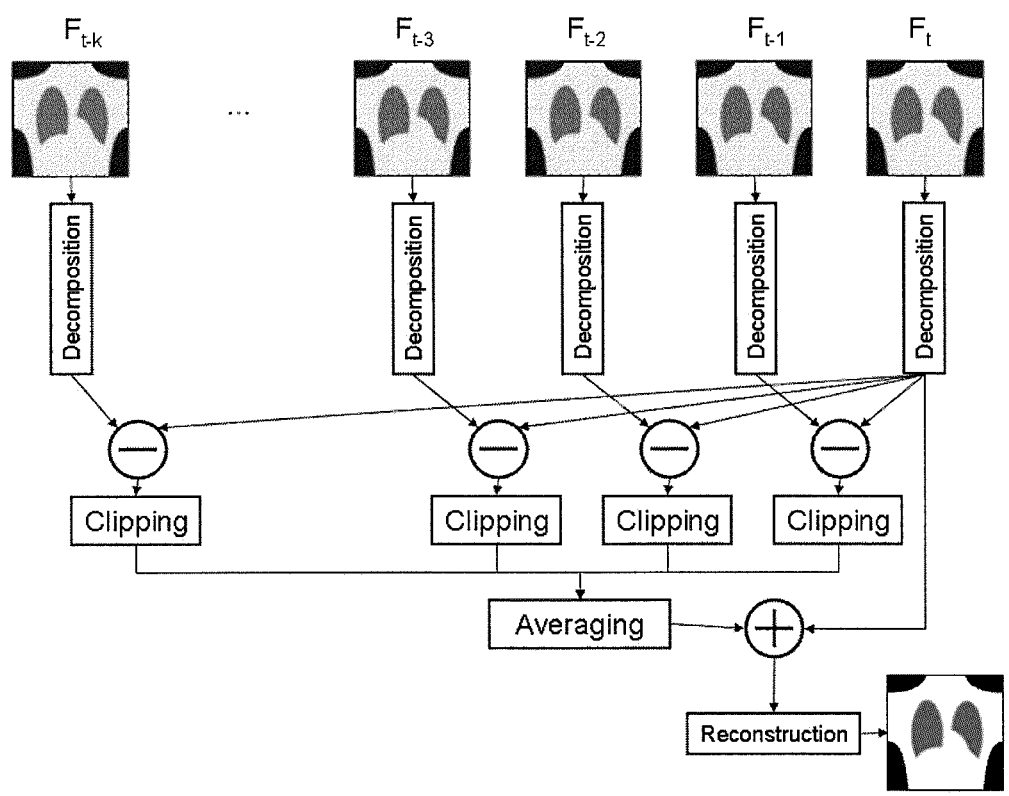

METHOD FOR NOISE REDUCTION IN AN IMAGE SEQUENCE

CROSS-REFERENCE TO RELATED APPLICATIONS

This application is a 371 National Stage Application of PCT/EP2014/069600, filed Sep. 15, 2014. This application claims the benefit of European Application No. 13186855.6, filed Oct. 1, 2013, which is incorporated by reference herein in its entirety.

BACKGROUND OF THE INVENTION

1. Field of the Invention

The present invention relates to a method for noise reduction in a sequence of images.

2. Description of the Related Art

In dynamic digital radiography, image sequences of an object are generated in real time. During acquisition multiple, successive digital images or frames (frame images) are taken. Successive images are recorded e.g. by a digital radiography detector.

The present invention focuses on applications in which motion or immediate feedback are crucial, e.g. the temporal evolution in contrast studies or interventional fluoroscopy to guide and verify surgical actions.

Compared to static x-ray images, the dose per image or frame can be extremely low for the fluoroscopic image sequences. As a result the noise content in a single frame is much higher compared to static images. Therefore noise reduction is a major concern in the process of visualization enhancement of fluoroscopic image sequences.

Typically, spatio-temporal filtering techniques are used to reduce the noise by making use of the strong correlation between successive frames.

State-of-the-art algorithms use motion estimation to balance the strength of spatial and temporal noise filtering. In static image regions, temporal noise filtering preserves image details far better than spatial filtering. However temporal filtering can generate artefacts called motion blur in strongly moving scenes. State-of-the-art noise reduction algorithms try to avoid motion blur by reducing the strength of temporal filtering in favour of spatial filtering when motion is detected over the frames.

Detection of motion in fluoroscopic image sequences is extremely difficult due to the high noise content. Motion compensated spatio-temporal filtering often fails to detect motion accurately as the high noise content corrupts the image gradients used to control the filters.

Almost all the state-of-the-art noise reduction filters are implemented as multi-scale filters: these filters are applied to the wavelet or Laplacian pyramid representations of the frames. Modifying the multi-scale decompositions allows more filtering of the high frequency noise signals while preserving the mid and low frequency structure signals in the images.

It is an aspect of the present invention to provide a multi-scale temporal noise reduction method that does not require motion estimation.

SUMMARY OF THE INVENTION

The above-mentioned aspects are realized by a method having the specific features set out below. Specific features for preferred embodiments of the invention are also set out below.

The present invention is applicable but not limited to a sequence of frames obtained in fluoroscopic medical imaging. In general, it can be applied to images obtained by various types of dynamic digital radiation imaging (e.g. dynamic digital radiography).

Frames can be obtained by recording images with a radiation sensor such as a solid state image detector applied in dynamic mode.

A method of the present invention is generally implemented in the form of a computer program product adapted to carry out the method steps of the present invention when run on a computer. The computer program product is commonly stored in a computer readable carrier medium such as a DVD. Alternatively the computer program product takes the form of an electric signal and can be communicated to a user through electronic communication.

Further advantages and preferred embodiments of the present invention will become apparent from the following description and drawing.

BRIEF DESCRIPTION OF THE DRAWINGS

FIG. 1 schematically shows the different steps of a preferred embodiment of the present invention.

DETAILED DESCRIPTION OF THE PREFERRED EMBODIMENTS

The proposed method is a multi-scale temporal noise reduction technique that does not require motion estimation.

The invention is applicable to all well-known multi-scale decomposition methods.

A multi-scale (or multi-resolution, whereby resolution refers to spatial resolution) decomposition of an image is a process that computes detail images at multiple scales of a grey value representation of the image.

A multi-scale decomposition mechanism generally involves applying filter banks to the grey value representation of the image for computing the detail images. Well-known techniques are for example: the Laplacian pyramid, the Burt pyramid, the Laplacian stack, the wavelet decomposition, QMF filter banks etc.

The pixels of the detail images represent the amount of variation of pixel values of the original image at the scale of the detail image, whereby scale refers to spatial extent of these variations.

An example of a multi-scale decomposition technique is described extensively in European patent application 527 525 A2.

Multi-scale noise reduction of a frame of interest in a sequence of frames is achieved by correcting at least one detail image of the multi-scale representation of the frame of interest.

The correction is performed by subjecting the multi-scale representation of said frame of interest to temporal filtering by adding at least one correction image to a corresponding (at the same scale) detail image(s) in the multi-scale representation of said frame of interest, said correction image(s) being computed by combining clipped difference images obtained as the difference between the multi-scale representation of the frame of interest and the multi-scale representations of a selection of other frames in said sequence.

Instead of the above-described addition a multiplication could also be performed. This is however a more complicated operation.

In accordance with a preferred embodiment of the present invention only the small-detail images in the multi-scale representation up to a predefined scale $s_{max}$ are modified. An optimal value for $s_{max}$ needs to be chosen as a function of the used pixel resolution and the noise characteristics. For example, $s_{max}$ will be lowered if binning of pixels in the detector is activated.

Large detail images at scales above $s_{max}$ will not be modified.

For example, $s_{max}$ will be lowered if binning of pixels in the detector is activated.

In an image sequence of successive frames $F_{t-k}, \ldots, F_{t-2}, F_{t-1}, F_t, F_{t+1}, F_{t+2}, \ldots, F_{t+k}$, the noise reduction of a frame of interest $F_t$ can be achieved by making use of a limited number of previous frames $F_{t-k}, \ldots, F_{t-2}, F_{t-1}$ (i.e. preceding the frame of interest in the acquired image sequence, either immediately preceding or still earlier frames). This allows real-time processing of the image sequence with limited delay.

A slightly better result can be achieved by making use of both a number of next and a number of previous frames in the sequence $F_{t-1}, F_{t+1}, F_{t-2}, F_{t+2}, \ldots$ as these closest frames in the sequence will be more similar to the frame of interest $F_t$ (t representing relative time of acquisition). However making use of the successive frames $F_{t+1}, F_{t+2}, \ldots$ will introduce a larger delay which is not optimal in real-time applications.

Hereafter a preferred embodiment is explained whereby only previous frames are being used for temporal filtering.

The number of previous frames (prior to the frame of interest) involved in the temporal filtering needs to be chosen as a function of the noise characteristics and the desired amount of noise reduction in the frame of interest.

For example, local standard deviation values (sliding window) are calculated of pixels at scale 0 in the frame of interest, the frequency histogram of these values is generated and the maximum bin of this histogram is used to determine $S_{max}$.

The proposed method pair-wise compares the multi-scale representation of each individual previous frame $F_{t-k}$ with the multi-scale representation of the frame of interest $F_t$.

For every scale s up to scale $s_{max}$ a difference image $\text{diff}_{s,t-k}$ is computed by subtracting the pixel values of detail images $d_{s,t}$ from these of detail image $d_{s,t-k}$ $$\text{diff}_{s,t-k} = d_{s,t-k} - d_{s,t}$$

These difference images are computed between the multi-scale representation of every involved previous frame $F_{t-k}, \ldots, F_{t-2}, F_{t-1}$ and the multi-scale representation of the frame of interest $F_t$.

The difference images $\text{diff}_{s,t-k}, \ldots, \text{diff}_{s,t-2}, \text{diff}_{s,t-1}$ contain differences due to noise, but also differences due to scene motion. To avoid motion artefacts or motion blur, the differences due to scene motion need to be reduced in the difference images.

As the pixel differences due to noise have a smaller magnitude than the pixel differences caused by scene motion, clipping is an efficient way to correct the pixel differences due to scene motion. Per scale predefined clipping bounds can be used.

A more adaptive approach is to define the clipping bounds in function of the computed noise level $ns_0$ in the frame of interest $F_t$.

The clipping bounds can be defined as $-w \cdot f_n \cdot ns_0$ and $+w \cdot f_n \cdot ns_0$.

The multiplicative factor $f_n$ is a scale-dependent normalization factor to take into account the decrease of the amplitude of the noise over the different detail scales.

The multiplicative factor w can be assigned to a predefined value or can be an inverse function of an image quality measurement, e.g. the signal-to-noise ratio.

For images with a high SNR, the noise content will be low and no or little correction is needed. For images with a low SNR, the noise content will be high and the clipping bounds must be large enough to achieve sufficient noise reduction.

Out of the clipped difference images, correction images $\text{corr}_s$ are computed. These correction images are added to the corresponding detail images of the multi-scale representation of the frame of interest (of the values of corresponding pixels, i.e. pixels with same position in the frame, are added).

The correction images can be computed as the average of the difference images:

$$\text{corr}_s = \sum_{i=1}^{k} \text{diff}_{s,t-i} / k + 1$$

Also weighted averaging is possible with decreasing weights for the older frames being used.

The corrected multi-scale representation of the frame of interest can be further used for visualization enhancement processing or can be reconstructed to a noise reduced output frame.

Having described in detail a preferred embodiment of the current invention, it will now be apparent to these skilled in the art that numerous modifications can be made therein without departing from the scope of the invention as defined in the appending claims. An example of such a modification is applying an additional spatial filtering step to the individual difference images to remove linear structures (originating from motion artefacts).

The invention claimed is:

1. A method for processing a frame of interest in a sequence of successively acquired frames of digital images of an object in digital radiation imaging without requiring motion estimation, the method comprising the steps of:
   generating a multi-scale representation of the successively acquired frames of the digital images of the object, the multi-scale representation including detail images of the object at different scales;
   subjecting the multi-scale representation of the frame of interest to temporal filtering by adding at least one correction image of the object to a detail image or detail images of the object in the multi-scale representation corresponding to the frame of interest in order to reduce noise in the frame of interest; wherein
   the at least one correction image of the object is computed by combining clipped difference images of the object obtained as a difference between the multi-scale representation of the frame of interest and the multi-scale representations of a selection of other frames of digital images of the object in the sequence.

2. The method according to claim 1, wherein the other frames of the digital images of the object in the sequence are a predefined number of image frames of the digital images of the object preceding an image of the object to be processed in the sequence.

3. The method according to claim 2, wherein the other frames of the digital images of the object in the sequence preceding the frame of interest are successive frames in the sequence.

4. The method according to claim 1, wherein the other frames of the digital images of the object in the sequence are a predefined number of frames preceding and a predefined number of frames of the digital images of the object following the frame of interest.

5. The method according to claim 2, wherein the predefined number of frames of the digital images of the object is a function of noise characteristics and/or a desired amount of noise reduction in the frame of interest.

6. The method according to claim 4, wherein the predefined number of frames of the digital images of the object is a function of noise characteristics and/or a desired amount of noise reduction in the frame of interest.

7. The method according to claim 1, wherein the clipped difference images of the object are obtained by clipping difference images of the object with a clipping bound that is defined per scale.

8. The method according to claim 1, wherein the clipped difference images of the object are obtained by clipping difference images of the object with a clipping bound that depends on a value of a noise level computed in the frame of interest.

9. The method according to claim 1, wherein the temporal filtering is only applied to the detail images of the object up to a predefined scale $s_{max}$.

10. A non-transitory computer readable medium comprising computer executable program code adapted to carry out the method of claim 1.

* * * * *